(12) United States Patent
LeGendre et al.

(10) Patent No.: US 7,996,686 B2
(45) Date of Patent: Aug. 9, 2011

(54) BRANCH TRACE METHODOLOGY

(75) Inventors: David Bruce LeGendre, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 12/168,692

(22) Filed: Jul. 7, 2008

(65) Prior Publication Data

US 2010/0005316 A1    Jan. 7, 2010

(51) Int. Cl.
*H04L 9/32* (2006.01)
(52) U.S. Cl. .................................. 713/189; 713/190
(58) Field of Classification Search .............. 726/26; 713/189–191; 717/100, 127–128
See application file for complete search history.

(56) References Cited

U.S. PATENT DOCUMENTS

| | | | | |
|---|---|---|---|---|
| 5,652,889 | A | * | 7/1997 | Sites .............................. 717/144 |
| 5,659,679 | A | * | 8/1997 | Alpert et al. .................... 714/34 |
| 2003/0135718 | A1 | | 7/2003 | DeWitt, Jr. et al. |
| 2003/0135719 | A1 | | 7/2003 | DeWitt, Jr. et al. |
| 2007/0294592 | A1 | | 12/2007 | Ashfield et al. |

FOREIGN PATENT DOCUMENTS

JP    63231640    9/1988

* cited by examiner

*Primary Examiner* — Hosuk Song
(74) *Attorney, Agent, or Firm* — Griffiths & Seaton PLLC (57) ABSTRACT

Method, system, and computer program product embodiments for performing a branch trace operation on a computer system of an end user are provided. An encrypted mapping macro is provided to the end user to be made operational on the computer system. A trace program is provided to the end user. The end user executes the trace program on the computer system as a diagnostic tool. The trace program is adapted for decrypting the encrypted mapping macro, determining a storage offset location of a branch instruction; checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to a coder.

23 Claims, 7 Drawing Sheets

```
* DCL 1 IFGACB ACBBASD ACBVIA,                              /*@LYA*/
*      2 ACBCOMN,                          /* ACB COMMON SECTION
*                                                              X03004 */
*          4 ACBID       PTR (8),          /* ACB IDENTIFIER         */
*          % ACBIDVAL = ' ' 'A0' 'X';      /* IDENTIFIER VALUE       */
*          4 ACBSTYP     PTR (8),          /* ACB SUBTYPE            */
*          % ACBSVSAM = ' ' '10' 'X';      /* VSAM SUBTYPE  @X04SVHS*/
*          % ACBSVRP   = ' ' '11' 'X';     /* VRP SUBTYPE   @X04SVHS*/
*          % ACBSVTAM = ' ' '20' 'X';      /* VTAM  SUBTYPE @X04SVHS*/
*          % ACBS3540 = ' ' '40' 'X';      /* 3540  SUBTYPE @X04SVHS*/
*          4 ACBLENG    FIXED (15),        /* ACB LENGTH IN BYTES    */
*            5 ACBLENG2 FIXED (15),        /* ACB LENGTH IN BYTES    */
*              6 ACBLEN2 FIXED (15),       /* ACB LENGTH IN BYTES
*                                                              X03004 */
*          4 ACBAMBL     PTR (31),         /* AMB LIST ADDRESS       */
*            5 ACBJWA    PTR (31),         /* JES WORKAREA ADDRESS   */
*              6 ACBIBCT PTR (31),         /* IBCT ADDRESS           */
*                7 ACBAMWAP PTR (31),      /* ACCESS METHOD WORKAREA
*                                             POINTER     @G29ASRL  */
*                  8 ACBSUBNM PTR (31),    /* SUBSYSTEM NAME ADDRESS
*                                                               @LYA */
*          4 ACBINRTN    PTR (31),         /* INTERFACE ROUTINE
*                                             ADDRESS              */
*          4 ACBMACRF    BIT (16),         /* MACRF FLAGS            */
*            5 ACBMACR1  BIT (8),          /* MACRF FIRST BYTE       */
*              6 ACBKEY  BIT (1),          /* ACCESS DATA VIA INDEX  */
*              6 ACBADR  BIT (1),          /* ACCESS WITHOUT INDEX   */
*                7 ACBADD BIT (1),         /* SAME AS ABOVE          */
*              6 ACBCNV  BIT (1),          /* CONTROL INTERVAL
*                                             PROCESSING           */
*                7 ACBBLK BIT (1),         /* SAME AS ABOVE          */
*              6 ACBSEQ  BIT (1),          /* SEQUENTIAL PROCESSING  */
*              6 ACBDIR  BIT (1),          /* DIRECT PROCESSING      */
*              6 ACBIN   BIT (1),          /* GET, READ              */
*              6 ACBOUT  BIT (1),          /* PUT, WRITE             */
*              6 ACBUBF  BIT (1),          /* USER BUFFERS           */
*            5 ACBMACR2  BIT (8),          /* MACRF SECOND BYTE      */
*              6 ACBNTRUN BIT (1),         /* DEFINED ONLY WHEN
*                                             OUTPUT AND ACBRECAF IS
*                                             ON. THE SYSTEM IS TO
*                                             ENSURE THAT THE LOGICAL
*                                             RECORD LENGTH WILL BE
*                                             THE SAME WHEN THE DATA
*                                             IS READ. (NO BLANK
*                                             TRUNCATION). BIT NOT
*                                             DEFINED FOR INPUT.
*                                                           @ZA92383 */
*              6 ACBCCANY BIT (1),         /* THE CONTROL CHARACTER
*                                             TYPE IS INDICATED IN
*                                             RPLOPT4 AFTER EACH GET.
*                                             NOT DEFINED FOR OUTPUT.
*                                                           @ZA92383 */
*              6 ACBBW0   BIT (1),         /* ELIGIBLE FOR BACKUP
*                                             WHILE OPEN  @YA39674  */
```

FIG.4

BRANCH TRACE METHODOLOGY

BACKGROUND OF THE INVENTION

1. Field of the Invention

The present invention relates in general to computers, and more particularly to a mechanism incorporating an improved methodology for performing a branch trace in a computing environment.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function.

In today's increasingly competitive marketplace, quality is of the utmost concern. Users' expectations are high and thus the reliability of hardware/software is especially important. Customers do not tolerate mistakes and the later a defect is discovered, the more costly it can prove to the manufacturer. Typically therefore, software developers implement a rigorous testing regime in order to ensure that a product or system is fully operational and consistently performs according to its functional specification, before it is made available to the public.

SUMMARY OF THE INVENTION

Software development is however an increasingly complex process. Even using the most rigorous techniques, software developed by people will suffer failures. Most software developers understand this and therefore accept the need to be able to effectively diagnose the cause of such a software failure. An effective technique is known as "tracing". In this technique a program records ("traces") important information that can be used for further analysis after the occurrence of a software failure. A computer system may be running an operating system (OS) 20, which could, for example, be Windows® Vista® available from Microsoft Corporation. A program executes on top of operating system and may consist of a number of separate modules, each defining separate functionality. As the program executes, it calls various trace functions which are used to record certain information in a trace log.

Two approaches to tracing are possible. The first, an instruction trace, traces every instruction of the computer program. The second, a branch trace, traces only the branches (jumps). Both approaches carry limitations. An instruction trace may be extremely large, and may be time consuming to debug. A branch trace is more condensed, but may also be difficult to use. Both traces show the address of the particular instruction being issued. As a result, in diagnosing the output of either trace, a user must convert storage offsets of the location in which the code was loaded into an offset location within the computer program. In addition, the user must switch back and forth between reading the trace log and reading the computer program code to try to determine what bit settings are causing the user to go down a specific path of code. Finally, the output of a branch trace does not return or display the condition check which caused the particular branch.

In light of the foregoing, a need exists for a tracing mechanism which solves the problems described above. Accordingly, in one embodiment, by way of example only, a method for performing a branch trace operation on a computer system of an end user is provided. An encrypted mapping macro is provided to the end user to be made operational on the computer system. A trace program is provided to the end user. The end user executes the trace program on the computer system as a diagnostic tool. The trace program is adapted for decrypting the encrypted mapping macro, determining a storage offset location of a branch instruction; checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to a coder.

In an additional embodiment, again by way of example only, a system for performing a branch trace operation on a computer system of an end user as an external diagnostic tool for a coder is provided. An encrypted mapping macro is provided to the end user to be made operational on the computer system. A trace module is provided to the end user as the external diagnostic tool. The encrypted mapping macro is usable only by the trace module. The trace module is adapted for decrypting the encrypted mapping macro to generate a decrypted mapping macro, the decrypted mapping macro only usable on the computer system by the trace program, determining a storage offset location of a branch instruction, checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to the coder.

In still another embodiment, again by way of example only, a computer program product for performing a branch trace operation on a computer system of an end user is provided. The computer program product comprises a computer-readable storage medium having computer-readable program code portions stored therein. The computer-readable program code portions comprise a first executable portion comprising an encrypted mapping macro provided to the end user to be made operational on the computer system, and a second executable portion comprising a trace program provided to the end user, the end user executing the trace program on the computer system as a diagnostic tool. The trace program is adapted for decrypting the encrypted mapping macro to generate a decrypted mapping macro, the decrypted mapping macro only usable on the computer system by the trace program, determining a storage offset location of a branch instruction, checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to a coder.

In still another embodiment, again by way of example only, a method for tracing the execution path of a computer program having at least one module including at least one branch instruction is provided. A storage offset location of the at least one branch instruction is determined. The storage offset location is checked for an identifying constant. The identifying constant is cross referenced with an entry in a mapping macro to identify a branch triggering bit and diagnostic information associated with the at least one branch instruction. The branch triggering bit and diagnostic information is returned.

In still another embodiment, again by way of example only, a computer program product for tracing the execution path of a computer program having at least one module including at least one branch instruction is provided. The computer program product comprises a computer-readable storage medium having computer-readable program code portions stored therein. The computer-readable program code portions comprise a first executable portion for determining a storage offset location of the at least one branch instruction, a second executable portion for checking the storage offset location for an identifying constant, a third executable portion for cross referencing the identifying constant with an entry in a mapping macro to identify a branch triggering bit and diagnostic information associated with the at least one branch instruction, and a fourth executable portion for returning the branch triggering bit and diagnostic information.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 shows an exemplary mapping macro associated with a profiled application.

DETAILED DESCRIPTION OF THE DRAWINGS

The following description and claimed subject matter set forth exemplary embodiments for implementing a CLI browser for a client/server pair. The CLI browser, in some respects, may be comparable to a browser used for the World Wide Web (WWW). The CLI browser embodiments function to break loose the close coupling between the client and server. For example, a client will, by default, have no knowledge of any one server, just as a client running a web browser has no knowledge of a web server until a universal resource locator (URL) is entered by a user.

The following description and claimed subject matter is directed to a set of related methodologies to be used within instruction tracing software, such as a tracing program. As background, a typical organization of hardware and software components within a data processing system is described prior to describing the present invention in more detail.

Figure 1A:
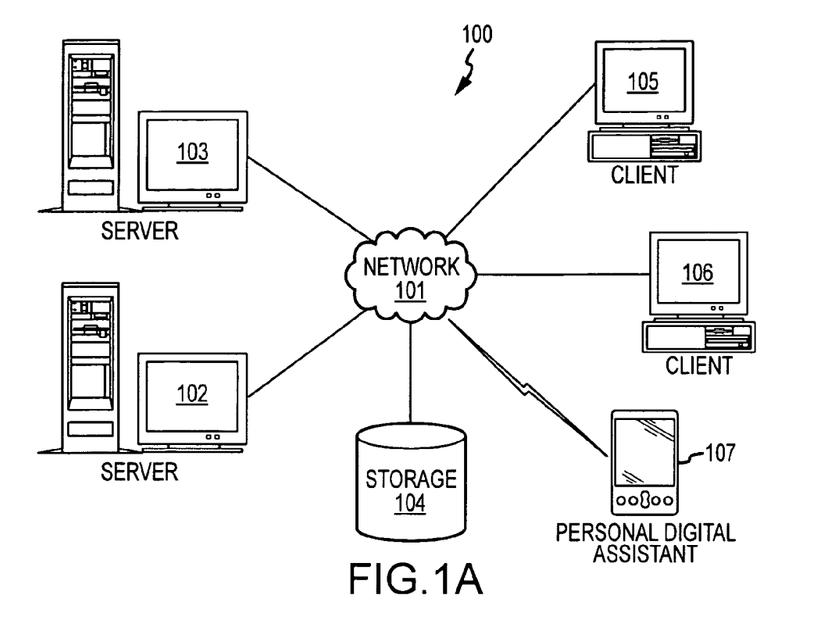
FIG. 1A depicts an exemplary data processing system in which the present invention may be implemented.

With reference now to the figures, FIG. 1A depicts a typical data processing system in which the present invention may be implemented. Data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of performance information may be initiated on a first device within the network, while a second device within the network receives the request, collects the performance information for applications executing on the second device, and returns the collected data to the first device.

Figure 1B:
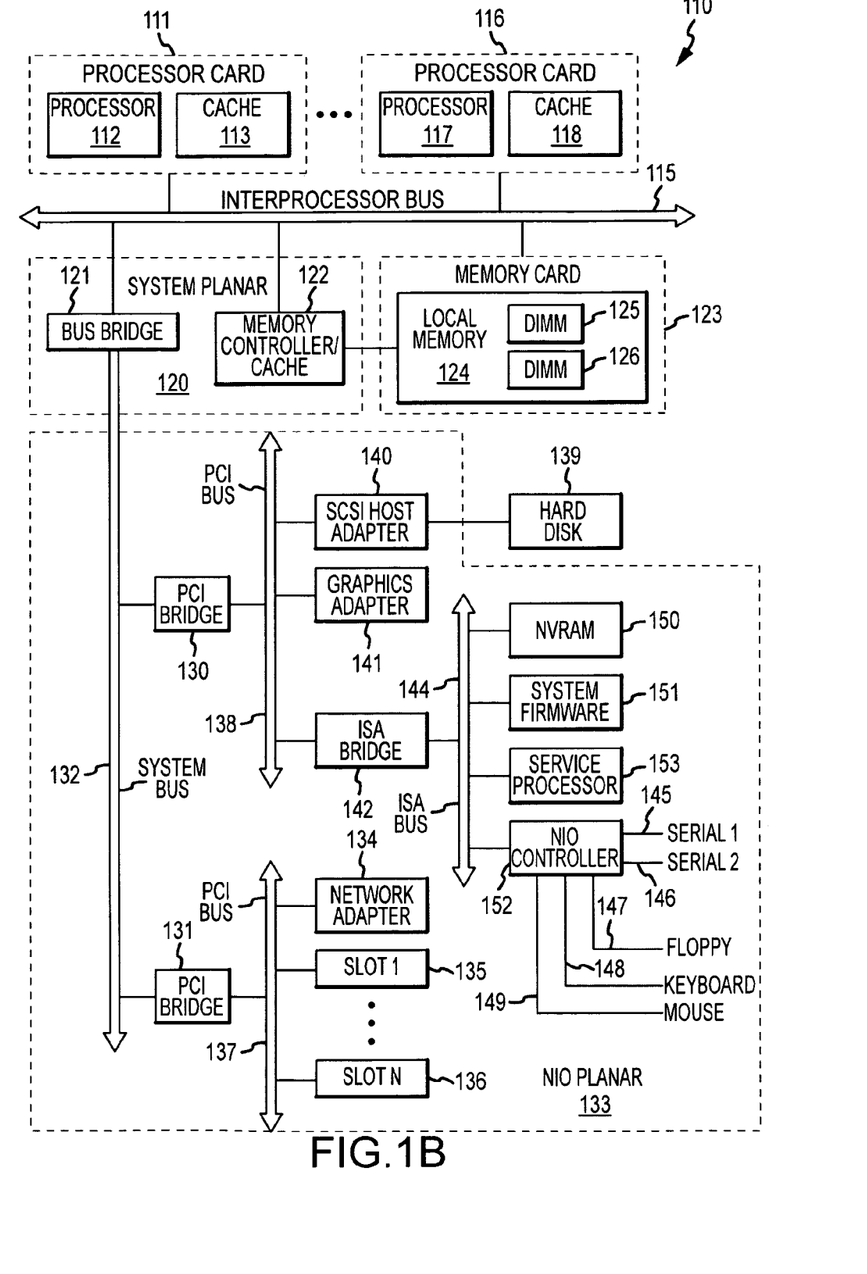
FIG. 1B depicts an exemplary computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and level two (L2) cache 113 that are connected to interprocessor bus 115. System 110 may contain a plurality of processor cards; processor card 116 contains processor 117 and L2 cache 118. Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135-136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 152 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 153 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

Figure 1C:
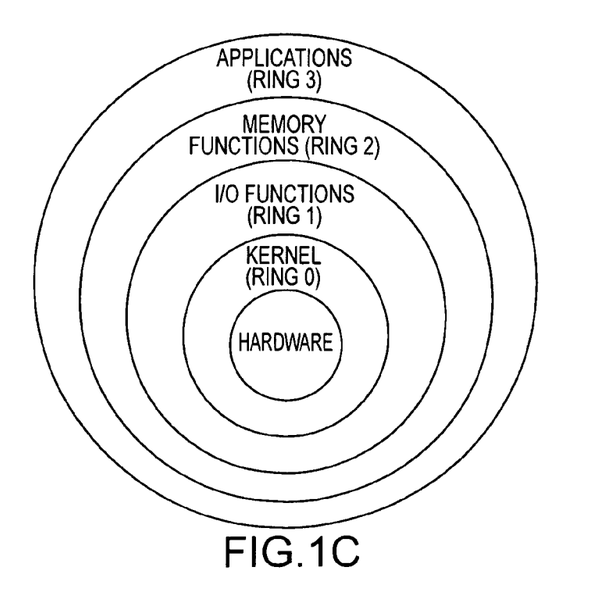
FIG. 1C depicts an exemplary software components within a computer system illustrating a logical relationship between the components as functional layers of software.

With reference now to FIG. 1C, an exemplary diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0-2, as a whole, may be viewed as the operating system of a particular device. Assuming that the operating system is extensible, software drivers may be added to the operating system to support various additional functions required by user applications, such as device drivers for support of new devices added to the system.

In addition to being able to be implemented on a variety of hardware platforms, the present invention may be implemented in a variety of software environments. A typical operating system (OS) may be used to control program execution within each data processing system. For example, one device may run a Linux® operating system, while another device may run an AIX® operating system.

Figure 1D:
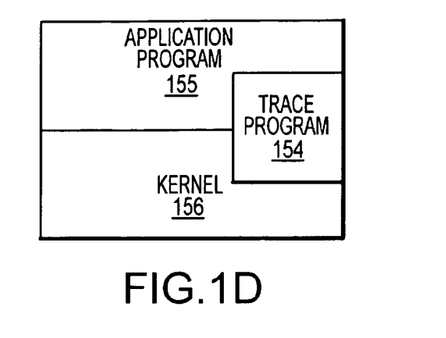
FIG. 1D depicts an exemplary relationship between software components in a data processing system that is being analyzed in some manner by a trace facility.

With reference now to FIG. 1D, a simple block diagram depicts an exemplary relationship between software components in a data processing system that is being analyzed in some manner by a trace facility. Trace program (module) 154 is used to analyze application program 155. Trace program/module 154 may be configured to handle a subset of interrupts on the data processing system that is being analyzed. When an interrupt or trap occurs, e.g., a single-step trap or a taken-branch trap (for branch traces), functionality within trace program 154 can perform various tracing functions, profiling functions, or debugging functions; hereinafter, the terms tracing, profiling, and debugging are used interchangeably. In addition, trace program 154 may be used to record data upon the execution of a hook, which is a specialized piece of code at a specific location in an application process. Trace hooks are typically inserted for the purpose of debugging, performance analysis, or enhancing functionality. Typically, trace program 154 generates trace data of various types of information, which is stored in a trace data buffer and subsequently written to a data file for post-processing.

Both trace program 154 and application program 155 use kernel 156, which comprises and/or supports system-level calls, utilities, and device drivers. Depending on the implementation, trace program 154 may have some modules that run at an application-level priority and other modules that run at a trusted, system-level priority with various system-level privileges.

Figure 1E:
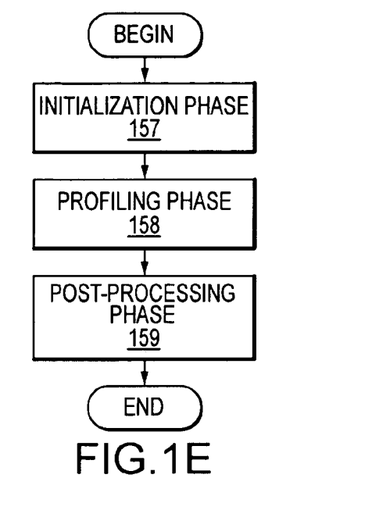
FIG. 1E depicts exemplary phases that may be used to characterize the operation of a tracing mechanism.

With reference now to FIG. 1E, a diagram depicts typical phases that may be used to characterize the operation of a tracing facility. An initialization phase 157 is used to capture the state of the client machine at the time tracing is initiated. This trace initialization data may include trace records that identify all existing threads, all loaded classes, and all methods for the loaded classes; subsequently generated trace data may indicate thread switches, interrupts, and loading and unloading of classes and jitted methods. A special record may be written to indicate within the trace output when all of the startup information has been written.

Next, during the profiling phase 158, trace records are written to a trace buffer or file. Subject to memory constraints, the generated trace output may be as long and as detailed as an analyst requires for the purpose of profiling or debugging a particular program.

In the post-processing phase 159, the data collected in the buffer is sent to a file for post-processing. During post-processing phase 159, each trace record is processed in accordance with the type of information within the trace record. After all of the trace records are processed, the information is typically formatted for output in the form of a report. The trace output may be sent to a server, which analyzes the trace output from processes on a client. Of course, depending on available resources or other considerations, the post-processing also may be performed on the client. Alternatively, trace information may be processed on-the-fly so that trace data structures are maintained during the profiling phase.

Figure 1F:
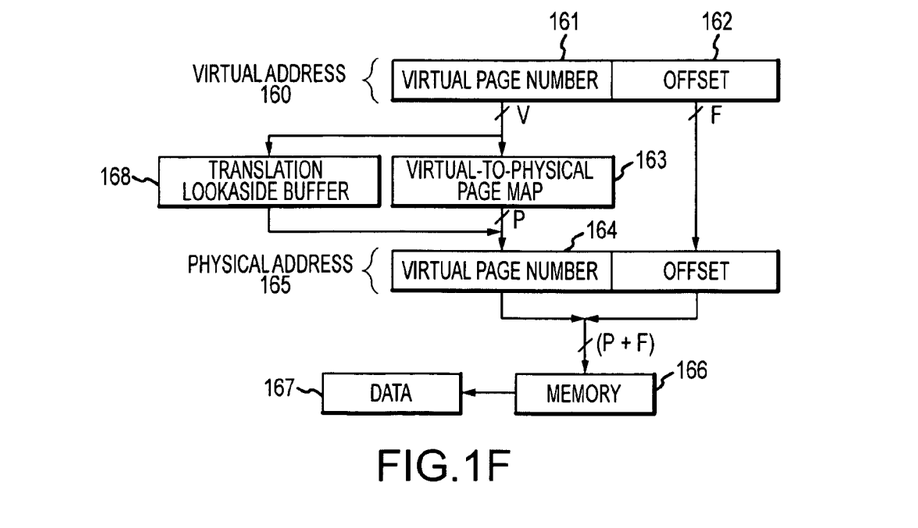
FIG. 1F depicts an exemplary memory addressing scheme for managing virtual memory within a data processing system.

With reference now to FIG. 1F, a diagram depicts a typical memory addressing scheme for managing virtual memory within a data processing system. When a functional unit within a processor needs to retrieve a datum, a memory address is used to locate the datum. Virtual memory schemes are used to present a large address space to a process on a data processing system with limited physical memory; virtual addresses may be mapped to physical addresses in a variety of well-known manners. The example shown in FIG. 1F depicts only pages, but it should be noted that similar schemes may incorporate different and/or additional memory fragmentation methodologies, such as segments, frames, etc.

Virtual address 160 comprises two portions: virtual page number 161 of "V" number of bits; and page offset 162 of "F" number of bits. Virtual page number 161 is used to access virtual-to-physical page map 163, which may also be termed a "page table." Virtual-to-physical page map 163 stores physical page numbers that have been indexed with an associated virtual page number; using virtual page number 161 as a lookup key, physical page number 164 of "P" bits can be retrieved, i.e. a virtual page number is mapped to a physical page number.

Together, physical page number 164 and page offset 162 comprise physical address 165 of "(P+F)" number of bits. Physical address 165 is presented to memory 166, which retrieves data 167 from the specified address. Additional caching mechanisms may also be included.

The page table/map is controlled and managed by the operating system and is usually kept in main memory, although various memory management schemes may enhance access to the page table with on-chip caches or registers that are located within the processor chip, such as translation lookaside buffer (TLB) 168. When the virtual page number is presented to the page table, it is simultaneously presented to the translation lookaside buffer. If there is a hit within the translation lookaside buffer, i.e., the translation lookaside buffer has an entry containing the virtual page number, then the physical page number is retrieved from the entry in the translation lookaside buffer. In addition, since an access to the translation lookaside buffer within the processor is much quicker than an access to the page table within main memory or some other cache, then the lookup in the page table is aborted or ignored because an access to the translation lookaside buffer completes first.

Figure 1G:
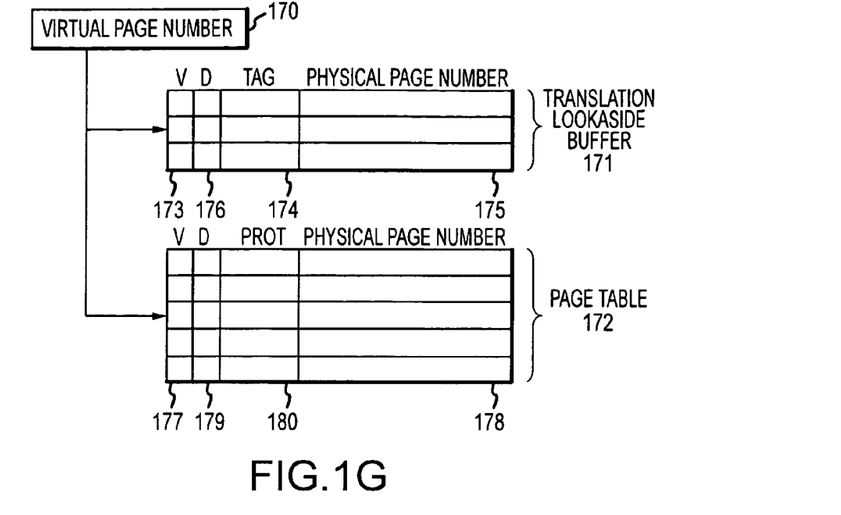
FIG. 1G depicts the structure of an exemplary translation lookaside buffer (TLB) and the structure of a typical page table for assisting with virtual memory management within a data processing system.

With reference now to FIG. 1G, a diagram depicts the structure of a typical translation lookaside buffer and the structure of a typical page table for assisting with virtual memory management within a data processing system. As mentioned with respect to FIG. 1F, virtual page number 170 is simultaneously asserted to translation lookaside buffer 171 and page 172.

Valid bit 173 in translation lookaside buffer 171 indicates whether a particular entry is being used. Translation lookaside buffer 171 is an associative memory; rather than addressing an associative memory with an address or an index, a tag is associated with each entry in the associative memory, and if a lookup value matching a tag is asserted, then the stored entry value in the matching entry is returned. In the case of a translation lookaside buffer, tag 174 is a virtual page number, and each entry contains physical page number 175 that has been associated with the virtual page number. Other data may be contained within each entry to manage various operations. In this example, dirty bit 176 indicates that a write to the physical page has occurred so that various flush, write-back, or write-through schemes can be managed.

Valid bit 177 in page table 172 indicates whether a particular entry is being used. Page table 172 is typical memory structure or array in which virtual page number 170 is used as an index into the page table, and the indexed entry is accessed to retrieve and return the associated physical page number 178. In certain implementations, a page table entry may hold a disk address to which a physical page has been swapped. Other data may be contained within each entry to manage various operations, such as dirty bit 179. Protection indicator 180 is another system-related item that may be stored within an entry and may comprise a few bit flags; these protection flags indicate various permissions that have been set for a page. For example, each page may be marked as read-only, write-only, execute-only, or some combination of read, write, and execute permissions or protections.

Figure 1H:
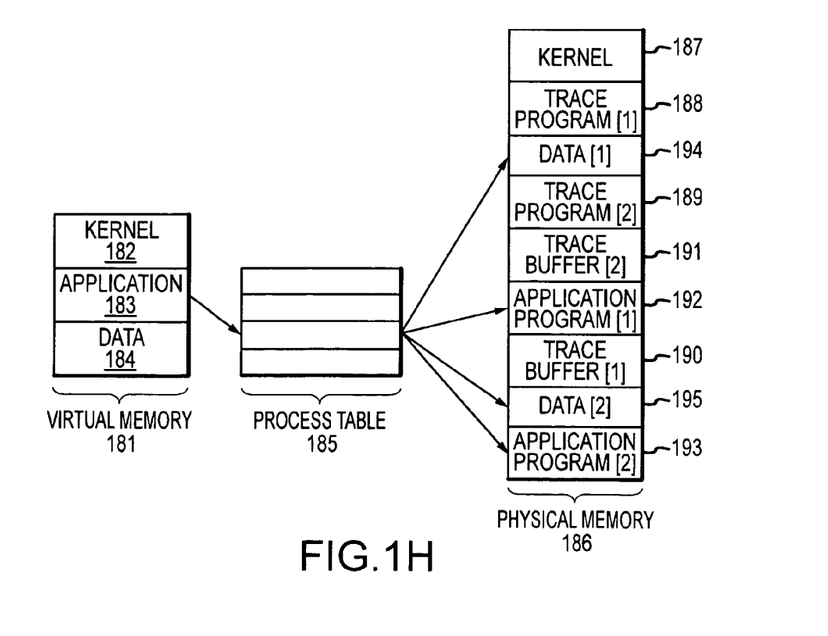
FIG. 1H depicts an exemplary map of an operational physical address space in conjunction with an operating system process table and an application's view of its virtual address space.

With reference now to FIG. 1H, a block diagram depicts a typical map of an operational physical address space in conjunction with an operating system process table and an application's view of its virtual address space. Virtual memory space 181 represents an application's view of its virtual address space. Kernel 182 may be "loaded" at the lowest addresses, while application 183 is "loaded" at higher addresses. When application 183 generates a memory allocation request for a data block, it may appear that a chunk of memory is always allocated from virtual memory at addresses that are higher than the location of the application itself, i.e. data region 184. If a trace program is also active within the system, it should be invisible to the application program.

The operating system performs memory management operations using various data structures, including a page table and process table 185, to ensure that the application program has this view of its address space. However, the memory map of physical memory 186 is much more discontiguous because memory may be allocated wherever possible depending on the amount of memory that is needed, the amount of memory that is available, and the page replacement algorithm. A typical snapshot of memory would show various allocation block sizes that are separated by unused portions of memory.

In the example shown in FIG. 1H, kernel 187 is loaded at the lowest addresses, and a first portion of trace program 188 is also loaded low. However, the trace program has been split, and a second portion of trace program 189 has been loaded higher. The trace buffer that the trace program needs for holding its output has also been split into a first trace buffer portion 190 and a second trace buffer portion 191. The application program has been split into a first application program portion 192 and a second application program portion 193, while data blocks have been allocated for the application program as data block 194 and data block 195.

The operating system uses process table 185 to track various information about an application process, including the location of its memory blocks. For example, when an application terminates, all of its memory blocks should be marked for garbage collection. It should be noted that various types of data structures may be used by an operating system to manage processes and memory, and the example shown in FIG. 1H is merely one example of many different schemes that may be used to track memory operations on behalf of an application process.

Moreover, the protection bits that were described above with respect to FIG. 1G may be also be stored within process table 185 that is shown in FIG. 1H or some other operating system data structure. In general, when an application file is loaded into memory, executable segments are marked as execute-only to protect them from being read or written, which might occur when an application process is operating erroneously or erratically.

As mentioned previously, tracing is an important analysis tool, but branch tracing may be difficult to perform due to the necessity of converting offsets of the storage location the program code was loaded into the offsets of the storage location within the computer program, as well as the difficulty to ascertain bit settings causing a particular branch. Hence, it would be advantageous to provide instruction tracing methodologies with an enhanced ability to avoid the aforementioned conversion and difficulty described above. The present invention is directed to a set of related methodologies to be used within instruction tracing software to alleviate these and other potential issues. With FIGS. 1A-1H as background, the present invention is described in more detail further below with respect to the remaining figures.

As mentioned above with respect to FIG. 1H, an operating system on a data processing system typically segments physical memory into segments, pages, frames, or other type of memory block, and applications are loaded into these portions of memory using a variety of techniques. A common feature with most operating systems is the ability of the operating system to protect executable code by marking a block of memory as execute-only; when an attempt is made to access an execute-only memory block, the operating system must not only determine that the accessing kernel or application process has the appropriate privileges to access the memory block, but it must also determine that the access is only for the purpose of executing instructions within the memory block. If the access is a read or a write, then the operating system would signal some type of error through an appropriate hardware or software interrupt.

The present invention utilizes mapping macros used to define a particular memory structure, or control block of the computer program. These mapping macros are consulted to identify the bit test causing a particular branch to be taken, as well as determine diagnostic information such as the bit name and a description of the bit usage. The bit test and its associated storage offset location may be saved for review.

Most control blocks have unique identifiers or "eye-catcher" data located at the front of the control block. The compare instruction in a bit test has a storage offset of a register. The register at the storage offset generally points to the front of the control block. The mechanisms of the present invention may consult the front portion of the control block and check for unique identifiers or eyecatcher data to indicate the type of control block (unit control block, process control block, data control block), and then use the appropriate mapping macro to provide additional diagnostic information including the bit name and usage. The usage may be found by consulting the comments of the macro after the particular bit name.

If the mapping macros are confidential in nature, the mapping macros may be encrypted and shipped to the end user, and may be adapted to be only usable by the tracing program (decrypted only under the trace program itself). In this way, the trace program operates as an external diagnostic tool of the coder/debugger. Such a mechanism preserves confidentiality, as the end user cannot see the mappings. Other mapping macros may be publicly available, such as operating services macros, so encryption would be unnecessary in that case. When the trace program is executed on an end user's system, the trace program decrypts the mapping macros as applicable. The end user collects the trace data, which is in turn forwarded to a coder/debugger on a remote system for review.

In addition to determining bit test information causing a branch ("branch triggering bit"), such information as an offset within a load module that is being listed may be returned to the coder/debugger for review rather than a storage address of the branch instruction. For implementations having module mappings in storage, a specific module name and offset within that module may be returned rather than the load module. For branches that take place due to a return or exit, the offsets within those modules may be shown without a bit name.

In an exemplary embodiment, a sample trace output may appear as follows:
BIT: invalid_parm1 ON BR FROM module2+324 TO module2+478, invalid_parm1 indicates user did not pass valid UCB The exemplary output above indicates that the bit invalid_parm1 is a branch triggering bit. Module2 is listed as the applicable module name, with the offset location of the branch starting at +324 and jumping to +478. Finally a description gleaned from the applicable mapping macro is listed, denoting that the branch triggering bit indicates that the user did not pass a valid unit control block (UCB).

Figure 2:
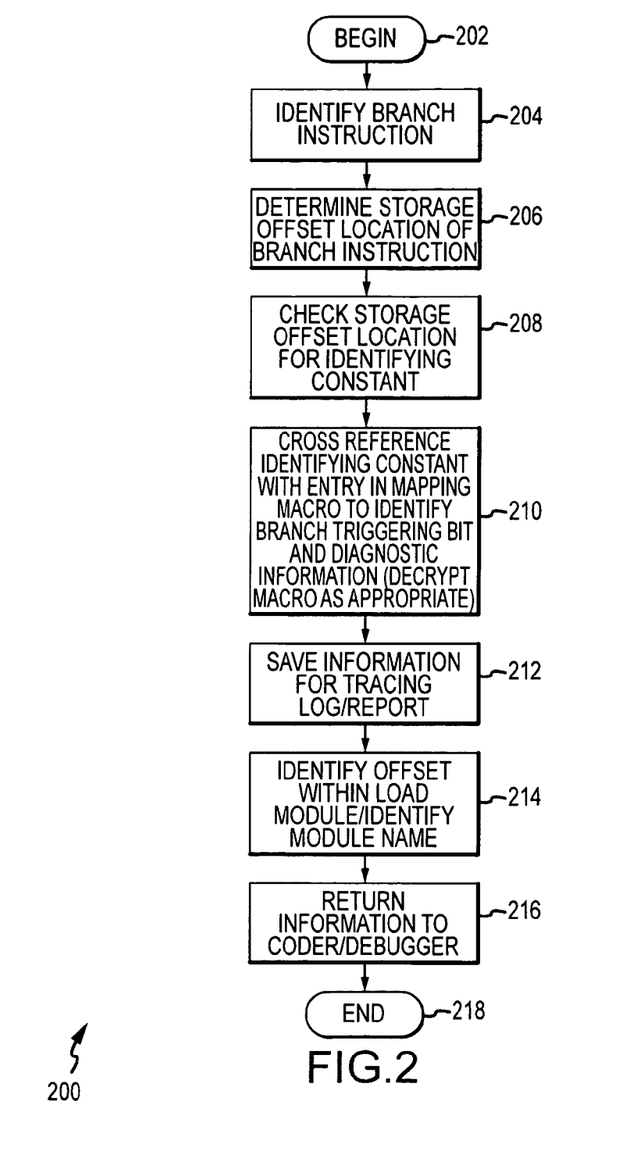
FIG. 2 depicts an exemplary method for implementing a tracing mechanism in which one or more aspects of the present invention may be incorporated.

FIG. 2 following illustrates an exemplary method 200 for tracing the execution path of a computer program having at least one module including at least one branch instruction. As one skilled in the art will appreciate, various steps in the methods may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 2 begins (step 202) by identifying a particular branch instruction (step 204). The storage offset location for the branch instruction is determined (step 206), by, for example, consulting the address pointed to by the register being used in the compare instruction. The register generally points to the beginning of the block being mapped. The beginning of the block being mapped is consulted for any identifying constant (such as eyecatcher data) (step 208). The offset which appears after the register is the particular byte being referenced within the control block. Once the identifying constant is determined, the applicable mapping macro associated with the identifying constant is consulted by locating the particular offset within the block being referenced. The identifying constant is cross referenced with an entry in the mapping macro to identify the particular branch triggering bit relevant to the branch instruction (step 210). Additionally, descriptive information associated with the branch triggering bit is recorded.

Again, in cases where mapping macros are confidential and are supplied as encrypted to the end user executing tracing module 154 (FIG. 1D), the mapping macros may be decrypted (and thereby usable only) by the trace program before they are consulted. Once the branch triggering bit, offset location, and descriptive information have been gathered, they may be saved for use in a tracing log/report (step 212). A storage offset location within an applicable load module (or in the case where module mappings are located in storage, the module name) may be identified (step 214). Such an identification is further described in method 300 (FIG. 3), following. The information is returned (displayed) to the coder debugger (step 216). The method 200 then ends (step 218).

Figure 3:
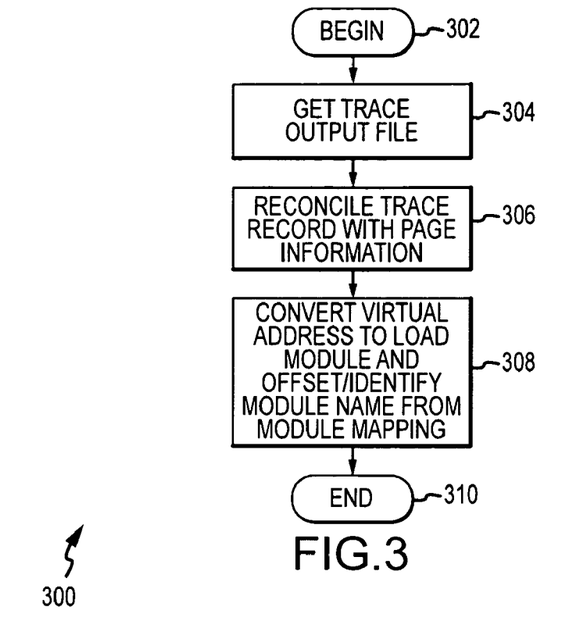
FIG. 3 illustrates an exemplary method by which the applicable load module, or module name, may be identified and returned to the coder/debugger.

FIG. 3 illustrates an exemplary method 300 by which the applicable load module, or module name, may be identified and returned to the coder/debugger. Method 300 may be completed during the post-processing phase. Method 300 begins (step 302). At this point, the trace output buffer has been written to a trace output file after an application has been profiled, and a trace analysis tool that is associated with the tracing program obtains the trace output file (step 304). The trace analysis tool then steps through the records within the trace output file; the records also comprise timestamp information associated with the time that a record was generated.

As the records from the trace output file are processed, a trace record containing page information, which would have been saved in step 214 (FIG. 2) shown in FIG. 2, is analyzed and reconciled with the tool's current memory map for the application (step 306). The captured page information comprises information about the manner in which the operating system loaded the segments or modules of a profiled application into various memory blocks (load modules). Hence, the trace analysis tool is able to generate a temporally accurate memory map by associating the application segments or modules with the memory blocks containing the executable code for the profiled application.

As other records from the trace output file are processed, the trace analysis tool will encounter trace records containing instruction addresses; in order to be more efficient, sets of instruction addresses may have been placed into a single trace record. An instruction address is then converted into an application segment or module along with an offset into that segment or module using the tool's current memory map for the application (step 308). For example, the current memory map may comprise the virtual addresses ranges or virtual page numbers into which the application's segments or module were loaded, and the virtual page number (the most significant portion of the virtual address) of an instruction's virtual address from a trace record can be compared to the virtual address ranges or virtual page numbers of the segments or modules. After an inclusive virtual address range is found, then the associated module or segment is identified, and the offset (the least significant portion of the virtual address) is used to access the segment or module. If module mappings are available, the name of the module may also be identified (step 308). The method 300 then ends (step 310).

Turning to FIG. 4, an exemplary mapping macro 400 associated with a profiled application is shown. The present invention may determine, as an initial matter, what program is being traced, and determine a number of mapping macros which are affiliated with the particular program. FIG. 4 shows an exemplary dummy control section (DSECT) for the IFGACB macro (field 402). The IFGACB macro is not confidential. DCL 1 level is the top level of the hierarchy (DCL1 IFGACB ACBBASD ACBVIA), with all other subsequent levels being size appropriate divisions of the DCL 1 level.

Field 404 denotes a series of bits that may be checked in making a particular branch decision ("4 ACBMACRF BIT (16))." For example, the 6 ACBDIR BIT(1) bit may identify whether a DIRECT processing request is being performed, and if so, the need to follow that particular code path (field 406). The comment field 408 to the bit denotes DIRECT processing. In the depicted example, if the 6 ACBDIR BIT(1) is determined to be a branch triggering bit, the bit name and descriptive information is saved and reported to the coder/debugger. For example, the coder/debugger would be informed that this particular branch was taken because of the value stored in the ACBDIR storage location.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for performing a branch trace operation on a computer system of an end user by a processor device, comprising:
 providing an encrypted mapping macro to the end user to be made operational on the computer system; and
 providing a trace program to the end user, the end user executing the trace program on the computer system as a diagnostic tool, wherein the trace program is adapted for:
  decrypting the encrypted mapping macro to generate a decrypted mapping macro, wherein the decrypted mapping macro is only usable on the computer system by the trace program,
  determining a storage offset location of a branch instruction,
  checking the storage offset location for an identifying constant,
  cross referencing the identifying constant with an entry in the decrypted mapping macro to identify a branch triggering bit and diagnostic information associated with the branch instruction, and
  returning the branch triggering bit and diagnostic information, the branch triggering bit and diagnostic information provided to a coder.

2. The method of claim 1, wherein the trace program is further adapted for identifying the branch instruction.

3. The method of claim 1, wherein returning the branch triggering bit and diagnostic information includes returning a bit name and a description of bit usage.

4. The method of claim 1, wherein the trace program is further adapted for saving the storage offset location, the branch triggering bit, and diagnostic information.

5. The method of claim 1, wherein the trace program is further adapted for identifying a plurality of available mapping macros associated with a computer program of the computer system to assist in locating the encrypted mapping macro.

6. The method of claim 1, wherein the trace program is further adapted for:
 identifying at least one module operational on the computer system, including the branch instruction, and
 returning the at least one module.

7. The method of claim 6, wherein returning the at least one module includes returning a module offset associated with the branch instruction.

8. A system for performing a branch trace operation on a computer system of an end user as an external diagnostic tool for a coder, comprising:
 an encrypted mapping macro provided to the end user to be made operational on the computer system; and
 a trace module operable by a processor device, the trace module provided to the end user as the external diagnostic tool, the encrypted mapping macro usable only by the trace module, wherein the trace module is adapted for:
  decrypting the encrypted mapping macro to generate a decrypted mapping macro, wherein the decrypted mapping macro is only usable on the computer system by the trace program, determining a storage offset location of a branch instruction, checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to the coder.

9. The system of claim 8, wherein the trace module is further adapted for identifying the branch instruction.

10. The system of claim 8, wherein the trace module is further adapted for returning a bit name and a description of bit usage.

11. The system of claim 8, wherein the trace module is further adapted for saving the storage offset location, the branch triggering bit, and diagnostic information.

12. The system of claim 8, wherein the trace module is further adapted for identifying a plurality of available mapping macros associated with a computer program of the computer system to assist in locating the encrypted mapping macro.

13. The system of claim 8, wherein the trace program is further adapted for:

identifying at least one module operational on the computer system, including the branch instruction, and returning the at least one module.

14. The system of claim 13, wherein the trace program is further adapted for returning a module offset associated with the branch instruction.

15. A computer program product for performing a branch trace operation on a computer system of an end user, the computer program product comprising a non-transitory computer-readable storage medium having computer-readable program code portions stored therein, the computer-readable program code portions comprising:

a first executable portion comprising an encrypted mapping macro provided to the end user to be made operational on the computer system; and a second executable portion comprising a trace program provided to the end user, the end user executing the trace program on the computer system as a diagnostic tool, wherein the trace program is adapted for:

decrypting the encrypted mapping macro to generate a decrypted mapping macro, wherein the decrypted mapping macro is only usable on the computer system by the trace program, determining a storage offset location of a branch instruction, checking the storage offset location for an identifying constant, cross referencing the identifying constant with an entry in the decrypted mapping macro to identify a branch triggering bit and diagnostic information associated with the branch instruction, and returning the branch triggering bit and diagnostic information, the branch triggering bit and diagnostic information provided to a coder.

16. The computer program product of claim 15, wherein the second executable portion comprising a trace program is further adapted for at least one of:

identifying the branch instruction, returning a bit name and a description of bit usage, and saving the storage offset location, the branch triggering bit, and diagnostic information.

17. A method for tracing the execution path of a computer program having at least one module including at least one branch instruction by a processor device, comprising:

determining a storage offset location of the at least one branch instruction, checking the storage offset location for an identifying constant, cross referencing the identifying constant with an entry in a mapping macro to identify a branch triggering bit and diagnostic information associated with the at least one branch instruction, encrypting the mapping macro to safeguard confidentiality, the mapping macro usable only by a tracing program, and returning the branch triggering bit and diagnostic information.

18. The method of claim 17, further including identifying the at least one branch instruction.

19. The method of claim 17, further including returning a bit name and a description of bit usage.

20. The method of claim 17, further including at least one of:

saving the storage offset location, the branch triggering bit, and diagnostic information, identifying a plurality of available mapping macros associated with the computer program to assist in locating the mapping macro, identifying the at least one module including the at least one branch instruction, returning the at least one module, and returning a module offset associated with the at least one branch instruction.

21. A computer program product for tracing the execution path of a computer program having at least one module including at least one branch instruction, the computer program product comprising a non-transitory computer-readable storage medium having computer-readable program code portions stored therein, the computer-readable program code portions comprising:

a first executable portion for determining a storage offset location of the at least one branch instruction;

a second executable portion for checking the storage offset location for an identifying constant;

a third executable portion for cross referencing the identifying constant with an entry in a mapping macro to identify a branch triggering bit and diagnostic information associated with the at least one branch instruction;

a fourth executable portion for returning the branch triggering bit and diagnostic information;

a fifth executable portion for identifying the at least one module including the at least one branch instruction; and a sixth executable portion for returning the at least one module, including returning a module offset associated with the at least one branch instruction.

22. The computer program product of claim 21, further including a seventh executable portion for encrypting the mapping macro to safeguard confidentiality, the mapping macro usable only by a tracing program.

23. The computer program product of claim 21, further including a seventh executable portion for saving the storage offset location, the branch triggering bit, and diagnostic information.

* * * * *